United States Patent
Yamada

(10) Patent No.: US 10,943,481 B2
(45) Date of Patent: Mar. 9, 2021

(54) DATABASE CREATION APPARATUS, PARKING LOT SEARCH APPARATUS, AND DATABASE CREATION METHOD

(71) Applicant: TOYOTA JIDOSHA KABUSHIKI KAISHA, Toyota (JP)

(72) Inventor: Kaoru Yamada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/169,643

(22) Filed: Oct. 24, 2018

(65) Prior Publication Data

US 2019/0130749 A1     May 2, 2019

(30) Foreign Application Priority Data

Oct. 27, 2017    (JP) .............................. JP2017-208325
Jun. 20, 2018    (JP) .............................. JP2018-117214

(51) Int. Cl.
    *B60Q 1/48*       (2006.01)
    *G08G 1/14*       (2006.01)
    *G06F 16/29*     (2019.01)

(52) U.S. Cl.
    CPC ............. *G08G 1/142* (2013.01); *G06F 16/29* (2019.01); *G08G 1/146* (2013.01)

(58) Field of Classification Search
None
See application file for complete search history.

(56) References Cited

U.S. PATENT DOCUMENTS

| | | | | |
|---|---|---|---|---|
| 2014/0292541 | A1* | 10/2014 | Korman | H04W 4/029 340/932.2 |
| 2016/0033290 | A1* | 2/2016 | Inoue | G01C 21/3679 701/400 |
| 2019/0122554 | A1* | 4/2019 | Saadeldin | G08G 1/148 |

FOREIGN PATENT DOCUMENTS

| | | |
|---|---|---|
| JP | H11-213292 A | 8/1999 |
| JP | 2009-169527 A | 7/2009 |
| JP | 2016-033501 A | 3/2016 |

* cited by examiner

*Primary Examiner* — Adolf Dsouza
(74) *Attorney, Agent, or Firm* — Hunton Andrews Kurth LLP

(57) ABSTRACT

A database creation apparatus includes a controller having at least one processor configured to: (1) acquire vehicle information including position information and status information of a vehicle and information relating to vehicle size of the vehicle associated with each other; (2) extract the position of the vehicle in a parked state on the basis of the vehicle information; and (3) add data indicating that general vehicles of the same vehicle size as the vehicle can be parked at the position to a parking lot database, if the position of the vehicle in the parked state does not coincide with a specific position at which only the vehicle or only specific vehicles including the vehicle are allowed be parked.

14 Claims, 10 Drawing Sheets

| PARKING LOT ID | PARKING LOT NAME | LOCATION INFORMATION | VEHICLE MODEL | DATA/TIME OF PARKING |
|---|---|---|---|---|
| | 2091 | 2092 | 2093 | 2094 | 2095 |
| P1 | A-Park | 35.085 137.170 | MODEL 1 | 2017/9/30 17:30 |
| P1 | A-Park | 35.085 137.170 | MODEL 1 | 2017/10/1 12:00 |
| P1 | A-Park | 35.085 137.170 | MODEL 2 | 2017/9/29 21:00 |
| ... | ... | ... | ... | ... |

| PARKING LOT | PARKING LOT NAME | LOCATION INFORMATION | MODEL 1 # OF PARKING | MODEL 1 LATEST PARKING DATE/TIME | MODEL 2 # OF PARKING | MODEL 2 LATEST PARKING DATE/TIME | ... |
|---|---|---|---|---|---|---|---|
| 2191 | 2192 | 2193 | 2194a | 2194b | 2195a | 2195b | |
| P1 | A-Park | 35.085 137.170 | 10 | 2017/9/30 17:30 | 15 | 2017/09/29 21:00 | ... |
| P2 | B-Park | 35.070 137.000 | 20 | 2017/09/27 15:00 | 10 | 2017/10/01 10:00 | ... |
| ... | ... | ... | ... | ... | ... | ... | ... |
| P6 | T-Park | 35.050 137.155 | 50 | 2017/10/01 17:00 | 30 | 2017/10/01 16:45 | ... |

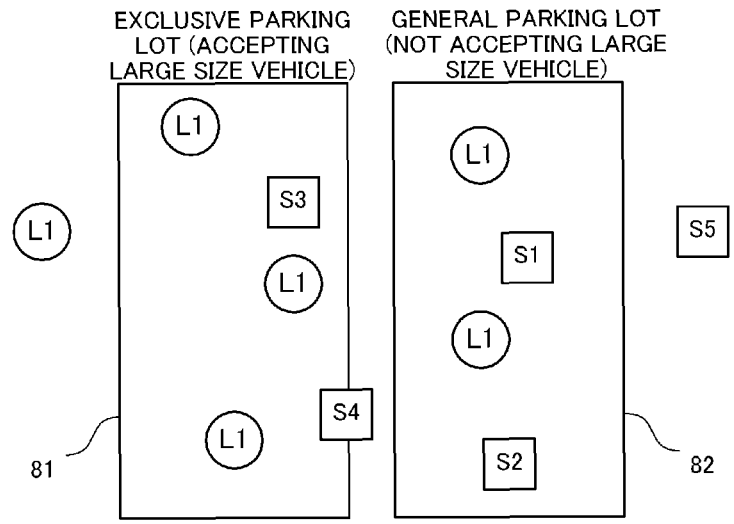
FIG. 8A  BEFORE DATA EXCLUSION
=> LEADING TO ERRONEOUS JUDGEMENT THAT LARGE VEHICLE CAN BE PARKED
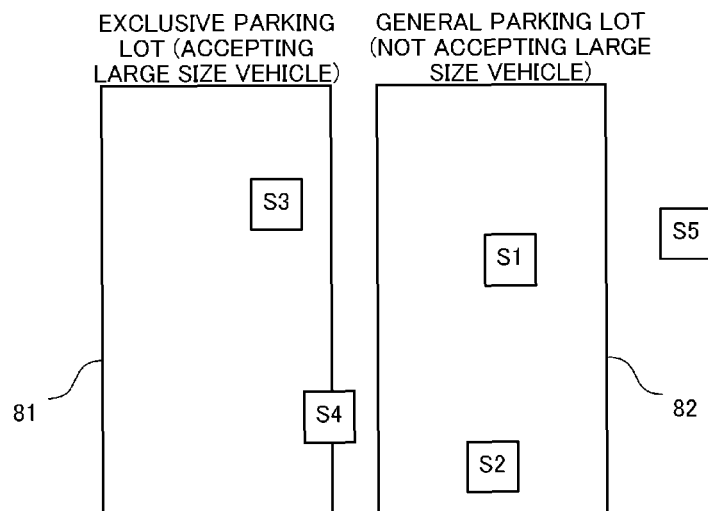
FIG. 8B  AFTER DATA EXCLUSION
=> LEADING TO CORRECT JUDGEMENT THAT ONLY SMALL SIZE VEHICLE CAN BE PARKED

| PARKING LOT ID (2121) | EXCLUSIVE PARKING LOT (2122) | NO PARKING AREA (2123) | LOCATION INFORMATION (2124) |
|---|---|---|---|
| P1 | NO | NO | 35.085 137.170 |
| P2 | YES | NO | 35.070 137.000 |
| P3 | NO | YES | 35.050 137.155 |
| . . . | | . . . | . . . |

| PARKING LOT ID (2091) | EXCLUSIVE PARKING LOT (2096) | NO PARKING AREA (2097) | LOCATION INFORMATION (2093) | VEHICLE MODEL (2094) | DATE/TIME OF PARKING (2095) |
|---|---|---|---|---|---|
| P1 | NO | NO | 35.085 137.170 | MODEL 1 | 2017/9/30 17:30 |
| P1 | NO | NO | 35.085 137.170 | MODEL 1 | 2017/10/1 12:00 |
| P1 | NO | NO | 35.085 137.170 | MODEL 2 | 2017/9/29 21:00 |
| . . . | . . . | . . . | . . . | . . . | . . . |

DATABASE CREATION APPARATUS, PARKING LOT SEARCH APPARATUS, AND DATABASE CREATION METHOD

CROSS-REFERENCE TO RELATED APPLICATIONS

This application claims the benefit of Japanese Patent Application No. 2017-208325 filed on Oct. 27, 2017 and Japanese Patent Application No. 2018-117214 filed on Jun. 20, 2018, which are hereby incorporated by reference in their entirety.

BACKGROUND

Technical Field

The present disclosure relates to technologies of creating a parking lot database from which the sizes of vehicles that can be parked in parking lots can be known.

Background Art

Patent Literature 1 in the citation list below discloses the service of providing information on vacant parking lots suitable for the size of vehicles. The service disclosed in Patent Literature 1 needs a database prepared in advance which contains data about the sizes of vehicles that can be parked in each parking lot. However, creating such a database is not easy. Some databases provided by managers of parking lots contain data about whether large size vehicles can be parked. However, it is not necessarily clear from such a database whether a vehicle of a specific model can actually be parked.

Patent Literature 2 discloses creation of a parking lot database based on probe information acquired from vehicles, where places where vehicles stay longer than a predetermined length of time are judged to be parking facilities. In the prior art disclosed in Patent Literature 2, information on the models of vehicles is taken into consideration so that the models of vehicles that can be parked in each parking lot can be known.

In the prior art disclosed in Patent Literature 2, places where vehicles stay longer than a predetermined length of time are judged to be parking facilities (or parking lots). In that case, there arises a problem that parking lots that are not available to vehicles in general (which will be also referred to as "exclusive parking lots" hereinafter), such as home parking lots and leased parking lots, are also judged to be parking lots. Moreover, in cases where an exclusive parking lot in which large size vehicles can be parked and a general parking lot in which large size vehicles cannot be parked are located adjacent to each other, it may be difficult to distinguish these parking lots due to insufficient accuracy of positional data. This leads to a problem that the place of these parking lots are judged to be a parking lot in which large size vehicle can be parked.

CITATION LIST

Patent Literature

Patent Literature 1: Japanese Patent Application Laid-Open No. H11-213292
Patent Literature 2: Japanese Patent Application Laid-Open No. 2009-169527

SUMMARY

The present disclosure is to create a parking lot database that enables accurate judgement as to the sizes of vehicles that can be parked in each parking lot.

According to a first aspect of the present invention, there is provided a database creation apparatus comprising a controller comprising at least one processor configured to: (1) acquire vehicle information including position information and status information of a vehicle and information relating to vehicle size associated with each other; (2) extract the position of said vehicle in a parked state on the basis of said vehicle information; and (3) add data indicating that a vehicle having said vehicle size can be parked at said position to a parking lot database, if the position of said vehicle in the parked state does not coincide with a specific position relating to said vehicle. According to another aspect of the present disclosure, there may be provided a database creation apparatus comprising an acquisition unit configured to acquire vehicle information including position information and status information of a vehicle and information relating to vehicle size associated with each other, a parking position extraction unit configured to extract the position of said vehicle in a parked state on the basis of said vehicle information, and a database creation unit configured to add data indicating that a vehicle having said vehicle size can be parked at said position to a parking lot database, if the position of said vehicle in the parked state does not coincide with a specific position relating to said vehicle.

The status information included in the vehicle information may be any information including information that enables a judgement to be made as to whether the vehicle is in a parked state or not. The status information may include information about at least one of turning on and off of the accessory power (ACC), turning on and off of the engine, turning on and off of the parking brake, retraction of the side mirrors, the speed of the vehicle, and the orientation of the vehicle.

The information relating to vehicle size included in the vehicle information may be any information based on which the vehicle size can be determined. The information relating to vehicle size may be information about the model of the vehicle or information including the data of the width, length, and height of the vehicle. In cases where a database in which identification information of the vehicle (vehicle ID) is stored in association with the model or size of the vehicle is available, the information relating vehicle size may be the identification information of the vehicle.

In the first aspect of the present disclosure, an example of the aforementioned specific position relating a vehicle is a position at which that vehicle or vehicles including that vehicle are allowed be parked. A typical example of such a position is a home parking lot or a leased parking lot for that vehicle. In cases where a database in which home parking lots and leased parking lots are registered on a vehicle-by-vehicle basis is available, it is possible to judge whether or not the position of a vehicle in the parked state is a specific position relating to the vehicle using this database. Alternatively, a position at which a vehicle has been parked at a frequency higher than a predetermined frequency may be regarded as a specific position relating to that vehicle. The predetermined frequency may be determined taking account of typical frequencies of use of home parking lots and leased parking lots. For example, the predetermined frequency may be set to e.g. twice a week or fifth a month.

The database creation apparatus as above can easily create a parking lot database that indicates which models of vehicles can be parked in each parking lot. This database can prevent places in which only specific vehicles are allowed to be parked, such as home parking lots and leased parking lots, from being erroneously regarded as parking lots in which general vehicles can be parked. Moreover, even in cases where a home parking lot in which large size vehicles can be parked and a general parking lot in which large size vehicles cannot be parked are located adjacent to each other, information associated with large vehicles for this place is not registered in the database. Thus, the place of these parking lots is registered correctly as a parking lot in which only medium and small size vehicles can be parked.

The apparatus according to the first aspect of the present disclosure may use a parking lot location database in which the locations of parking lots are stored in advance. In that case, the processor may be further configured to add data indicating that a vehicle having said vehicle size can be parked at said position to said parking lot database, if the position of said vehicle in the parked state coincides with the location of a parking lot stored in said parking lot location database. Thus, which sizes of vehicles can be parked in already known parking lots can be known. Moreover, places other than parking lots are prevented from being judged erroneously as parking lots.

The apparatus according to the first aspect of the present disclosure may further be configured to extract the location of a parking lot on the basis of vehicle information. The processor may be configured to extract the position of said vehicle in the parked state at which parking is allowed by laws and regulations as the location of a parking lot. Here, laws refer to legislation enacted typically by assemblies (or legislative organs) and regulations refer to legislation enacted typically by administrative organs (including the central government and local public entities). It may be understood that the expression "a position at which parking is allowed by laws and regulations" means a position at which parking is not prohibited by laws or regulations. This feature prevents positions at which parking is prohibited from being extracted erroneously as parking lots.

According to a second aspect of the present disclosure, there is provided a parking lot search apparatus comprising: a database creation apparatus for creating a parking lot database according to claim 1; and a controller comprising at least one processor configured to: (1) receive from a user's terminal a search request including position information and information relating to vehicle size that requests search for parking lots in which a vehicle of said vehicle size can be parked in an area within a predetermined distance from the position specified by said position information; (2) search said parking lot database for parking lots in which a vehicle of said vehicle size can be parked in an area within said predetermined distance from the position specified by said position information included in said search request; and (3) send information about parking lots found by search to said user's terminal. According to another aspect of the present disclosure, there is provided a parking lot search apparatus comprising the above-described database creation apparatus, a reception unit configured to receive from a user's terminal a search request including position information and information relating to vehicle size that requests search for parking lots in which a vehicle of said vehicle size can be parked in an area within a predetermined distance from the position specified by said position information, a search unit configured to search said parking lot database for parking lots in which a vehicle of said vehicle size can be parked in an area within said predetermined distance from the position specified by said position information included in said search request, and a transmission unit configured to send information about parking lots found by search to said user's terminal.

The parking lot search apparatus according to the second aspect of the present disclosure can present parking lots in which a vehicle of the requested vehicle size can be parked.

In the apparatus according to the second aspect of the present disclosure, in cases where there are a plurality of parking lots that meet the search request, said processor or search unit assigns higher priorities to parking lots in which the number of times of parking of vehicles of said vehicle size specified in said search request in the past is larger or parking lots of which the time of latest parking of a vehicle of said vehicle size is later. Thus, it is possible to present more appropriate parking lots with higher priorities.

In cases where said information relating to vehicle size is information about vehicle model, the apparatus according to the second aspect of the present disclosure may further include storage unit in which inclusion relationship in the possibility of parking among vehicle models is stored. Then, said processor or search unit may search said parking lot database for parking lots that meet said search request taking into consideration the inclusion relation in the possibility of parking among vehicle models. The aforementioned inclusion relation in the possibility of parking is such relationship, for example, that if a vehicle of model A can be parked, then a vehicle of model B can also be parked. If this feature is employed, even when information about parking of vehicles of a certain model is absent, it is possible to judge whether a vehicle of that model can be parked or not, leading to an increase in the number of parking lots found by search. Such inclusion relation in the possibility of parking may be created manually by an administrator or automatically by the database creation apparatus by analyzing vehicle information.

The apparatus according to the second aspect of the present disclosure may further be configured to acquire information about the vacancy of parking lots, and to search for parking lots that meet said search request and have a vacant space. With this feature, parking lots having a vacant space in which a vehicle of the requested model can be parked can be searched for.

According to other aspects of the present disclosure, there are provided a database creation method and a parking lot search method including at least a part of the above-described processing, a computer program that causes a computer to perform these methods, and a computer-readable storage medium in which that computer program is stored in a non-temporary manner.

The above-described means and processing may be employed in any feasible combination to carry out the present disclosure.

According to the present disclosure, it is possible to create a parking lot database that enables accurate judgement as to the sizes of vehicles that can be parked in each parking lot.

BRIEF DESCRIPTION OF THE DRAWINGS

FIGS. 6A and 6B are tables showing exemplary parking lot databases.

FIGS. 8A and 8B are diagrams illustrating an advantageous effect of the first embodiment.

FIG. 10 is a table showing an exemplary parking lot location database created according to the second embodiment.

FIG. 11 is a table showing an exemplary parking lot database created according to the second embodiment.

DESCRIPTION OF THE EMBODIMENTS

First Embodiment

A first embodiment of the present disclosure relates to a parking lot database creation system (parking lot DB system) that collects vehicle information (probe information) from vehicles and creates a parking lot database (parking lot DB) that enables a judgement to be made as to whether a vehicle of each model can be parked in a parking lot, on the basis of the collected vehicle information. In the following, this system will be described with reference to the drawings.

1. Outline of System

Figure 1:
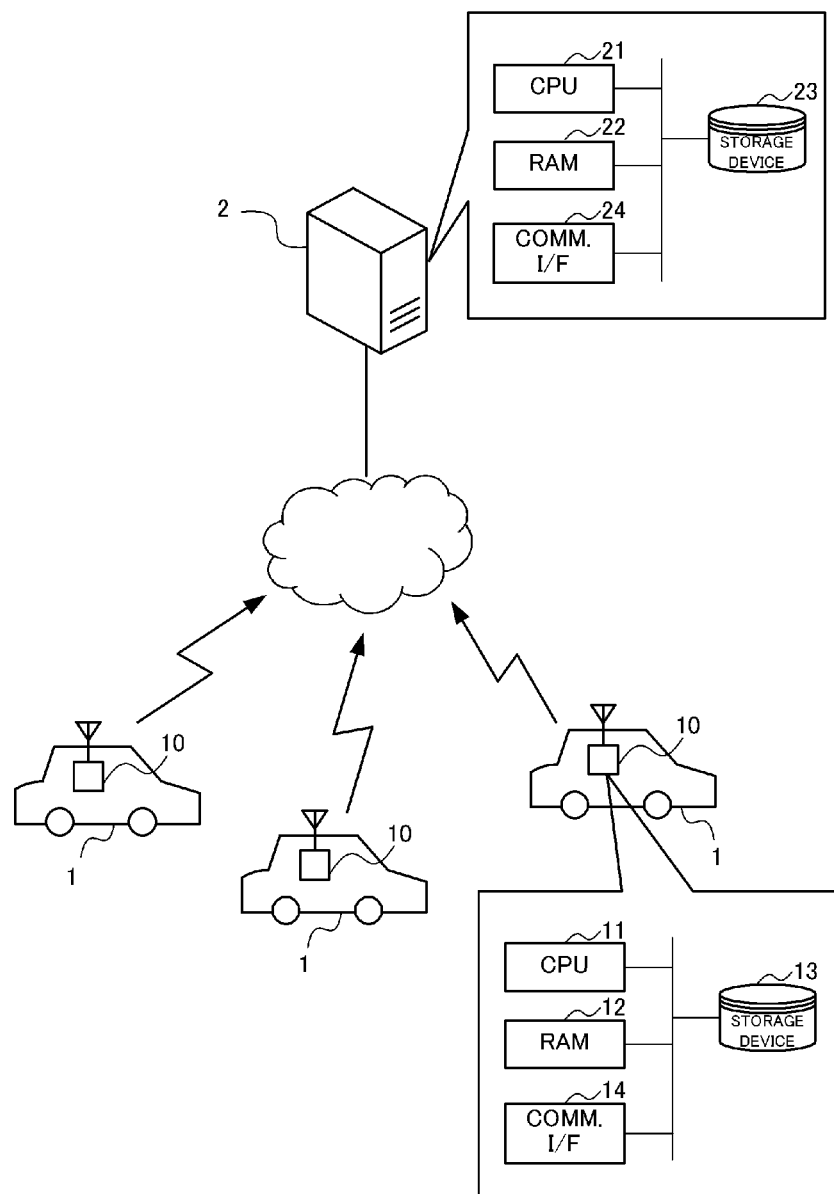
FIG. 1 is a diagram showing the outline of a parking lot database creation system according to a first embodiment.

FIG. 1 is a diagram showing the outline of the parking lot database creation system according to the first embodiment. The system includes a plurality of vehicles 1 each provided with an in-vehicle terminal 10 and a server apparatus (serving as a parking lot database creation apparatus) 2. The in-vehicle terminal 10 transmits vehicle information (probe information) including position information, status information, and model information of the vehicle to the server apparatus 2 at predetermined time intervals. The server apparatus 2 collects the vehicle information from in-vehicle terminals 10 and creates a parking lot DB that enables a judgement to be made as to whether a vehicle of each model can be parked in a parking lot on the basis of the collected vehicle information. Specifically, the server apparatus 2 acquires the position at which a vehicle was parked from the vehicle information, and creates a database indicating which models of vehicles (or which sizes of vehicles) have been parked in which parking lots. Thus, it becomes possible to know which models of vehicles have been parked actually in each parking lot. The creation of the parking lot DB will be described more specifically later.

2. Configuration 2-1 In-Vehicle Terminal

Figure 2:
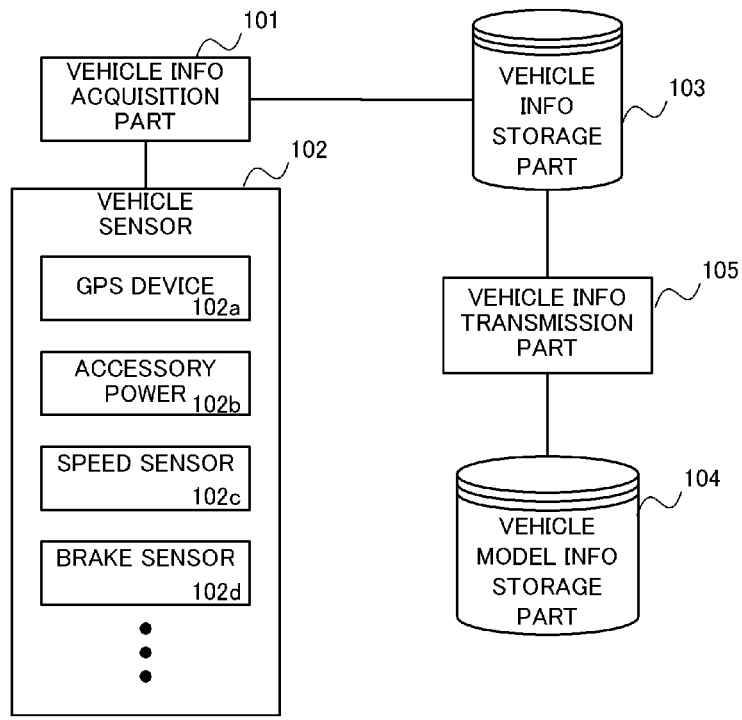
FIG. 2 is a diagram showing the functional configuration of an in-vehicle terminal.

As shown in FIG. 1, the in-vehicle terminal 10 has a CPU (Central Processing Unit) 11, a RAM (Random Access Memory) 12, a storage device 13, and a communication interface (I/F) 14. The in-vehicle terminal 10 is connected to a vehicle network (not shown) of the vehicle 1 and can acquire sensor measurement values and status information from various sensors and control apparatus of the vehicle 1. The CPU 11 executes a program loaded from the storage device 13 to implement the functions or functional blocks shown in FIG. 2, which include a vehicle information acquisition part 101, a vehicle information storage part 103, a vehicle model information storage part 104, and a vehicle information transmission part 105. Some or all of these functions may be implemented by hardware circuits, such as ASICs or FPGAs, alternatively.

The vehicle information acquisition part 101 acquires information about the state of the vehicle from vehicle sensors 102 and stores it in the vehicle information storage part 103. The acquisition of the vehicle information may be performed at regular intervals (e.g. one, five, or ten minutes) and/or every time when a specific event (e.g. turning-on or off of the accessory power or engine) occurs. In this embodiment, the acquisition of the vehicle information is performed at intervals of one minute and, additionally, at the time when the accessory power is switched between on and off.

Examples of the vehicle sensors 102 include a GPS device 102a, an accessory power source 102b, a vehicle speed sensor 102c, and a brake sensor 102d. The GPS device 102a acquires position information (latitude, longitude, and altitude) of the vehicle 1 on the basis of a signal from GPS satellites and outputs a signal representative of the position information. The accessory power source 102b outputs a signal representative of the on and off status of the accessory power of the vehicle 1. The vehicle speed sensor 102c measures the speed of the vehicle 1 and outputs a signal representative of the measured vehicle speed. The brake sensor 102d senses the status of the brake, such as the amount of depression of the brake pedal and the on and off status of the parking brake and outputs a signal representative of the sensed status.

While specific sensors are mentioned above by way of example, other sensors may also be employed. For example, the vehicle information acquisition part 101 may acquire vehicle information from signals output from an ignition switch, an accelerator opening degree sensor, a steering angle sensor, a direction sensor, and/or a wiper controller. The position information may be acquired using a positioning device other than the GPS device, such as a GNSS (Global Navigation Satellite System) or a base station positioning device.

The vehicle information storage part 103 stores the vehicle information acquired by the vehicle information acquisition part 101 in association with the time of acquisition.

The vehicle model information storage part 104 stores information representative of the model of the vehicle 1. The vehicle model information is an example of information relating to vehicle size. The "model" or the "vehicle model" referred to in this embodiment does not necessarily correspond to the model defined by the vehicle manufacturer, but it may be any category associated with the size of the vehicle. Since the system according to this embodiment is to create a parking lot database that enables a judgement to be made as to whether a vehicle of each model can be parked in a parking lot, a plurality of vehicles having substantially the same size and turning performance may be regarded to be of the same model.

The vehicle information transmission part 105 associates the vehicle information stored in the vehicle information storage part 103 and the vehicle model information stored in the vehicle model information storage part 104 and transmits them to the server apparatus 2 through the communication I/F 14. The scheme of transmission used in the communication I/F 14 is not limited to particular schemes. Examples of feasible scheme include LTE (Long Term Evolution), 5G and Wi-Fi. The timing of transmission by the vehicle information transmission part 105 is not limited to particular timing. For example, the transmission may be performed every time the vehicle information is acquired, at regular intervals (e.g. 30 minutes or one hour), at the time when a specific event (e.g. turning-on or off of the accessory power) occurs, or in a specific time of the day (e.g. in the night).

Figure 3:
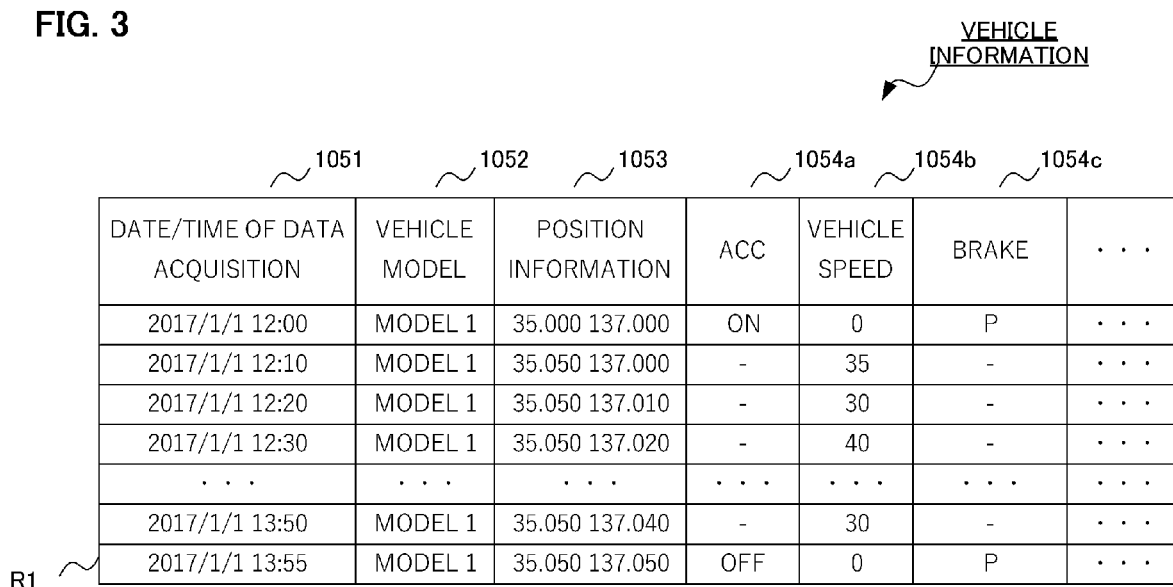
FIG. 3 is a table showing an example of vehicle information transmitted from the in-vehicle terminal to a server apparatus.

FIG. 3 is a table showing an example of vehicle information transmitted from the vehicle information transmission part 105 to the server apparatus 2. In this embodiment, the vehicle information transmitted includes the date and time of data acquisition 1051, the vehicle model 1052, the position information 1053, the accessory power (ACC) status 1054a, the vehicle speed 1054b, and the brake status 1054c. The date and time of data acquisition 1051 is information representative of the date and time at which the vehicle information of one record was acquired. The vehicle model 1052 is the information stored in the vehicle model information storage part 104. The position information 1053 is information acquired from the GPS device 102a. While the latitude and longitude are shown in FIG. 3, the position information 1053 may further include the altitude. The ACC status 1054a is information from which the time of switching between on and off of the accessory power can be determined. The vehicle speed 1054b is information acquired from the vehicle speed sensor 102c. The brake status 1054c is information from which on and off of the parking brake can be known. The vehicle information transmitted by the vehicle information transmission part 105 may further include information representative of some state of the vehicle other than mentioned above.

2-2 Server Apparatus

Figure 4:
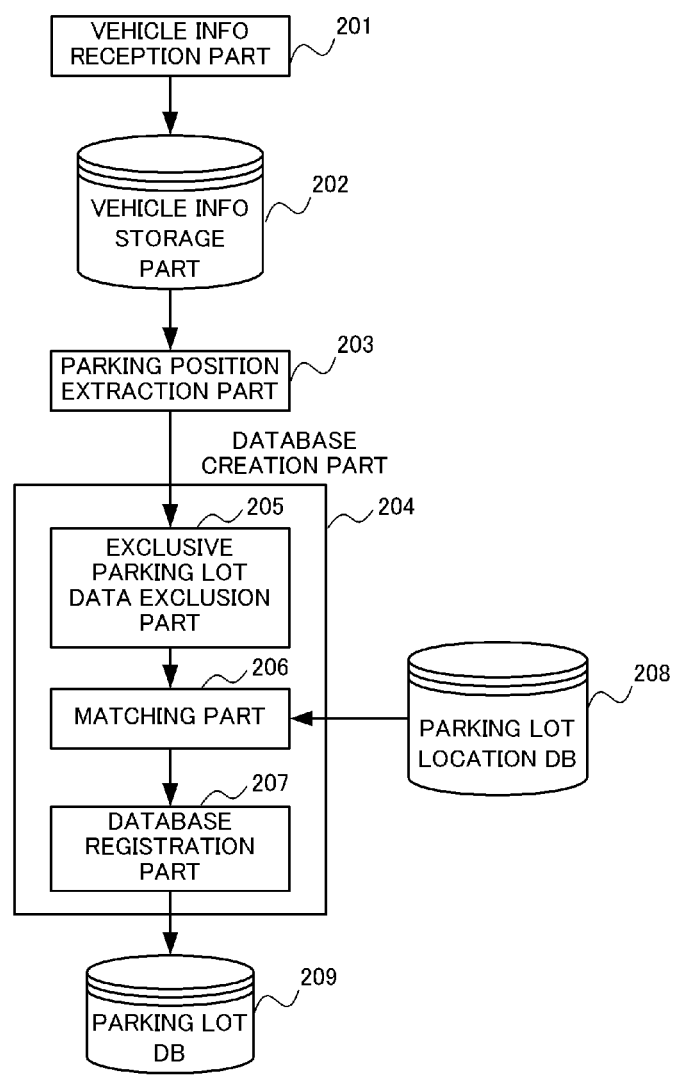
FIG. 4 is a diagram showing the functional configuration of the server apparatus.

As shown in FIG. 1, the server apparatus 2 has a CPU (Central Processing Unit) 21, a RAM (Random Access Memory) 22, a storage device 23, and a communication interface (I/F) 24. The CPU 21 executes a program loaded from the storage device 23 to implement the functions or functional blocks shown in FIG. 4, which include a vehicle information reception part 201, a vehicle information storage part 202, a parking position extraction part 203, a database creation part 204, and a parking lot location database 208. The database creation part 204 includes an exclusive parking lot data exclusion part 205, a matching part 206, and a database registration part 207. Some or all of these functions may be implemented by hardware circuits, such as ASICs or FPGAs, alternatively.

The vehicle information reception part 201 receives vehicle information from a plurality of vehicles 1 through the communication I/F 24 and stores the vehicle information in the vehicle information storage part 202. The vehicle information storage part 202 stores a large amount of vehicle information shown in FIG. 3.

The parking position extraction part 203 (which will also be referred to as the "extraction part 203" hereinafter) consults the vehicle information storage part 202 to specify records of vehicle information at times when vehicles are in the parked state and extracts the positions at which vehicles are in the parked state. In this embodiment, records made at times when the accessory power is switched from on to off are specified as records of vehicle information at times when vehicles are in the parked state. The parking position extraction part 203 may create a temporary table (or view) that contains only the records specified in this way.

The database creation part 204 creates a parking lot database 209 in which records each including the location of a parking lot, the model of the parked vehicle, and the date and time of parking are stored, on the basis of the vehicle information extracted by the extraction part 203 and the parking lot location database 208. The database creation part 204 includes the exclusive parking lot data exclusion part 205, the matching part 206, and the database registration part 207.

Figure 5:
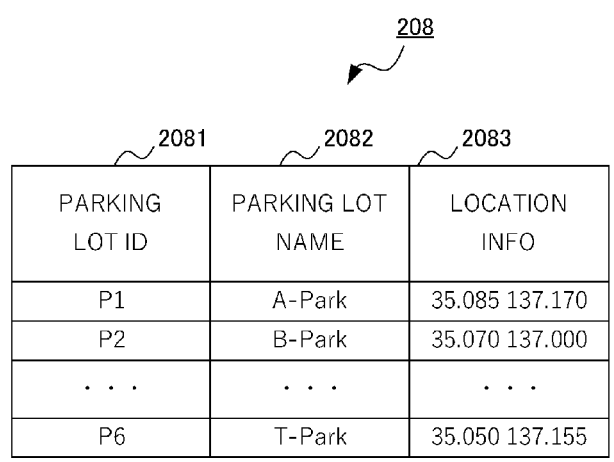
FIG. 5 is a table showing an exemplary parking lot location database.

The parking lot location database 208 is a database in which the data of the locations of parking lots that can be used by vehicles in general is stored. As shown in FIG. 5, the data stored in the parking lot location database 208 in this embodiment includes parking lot ID 2081, parking lot name 2082, and location information 2083. While the location information 2083 shown in FIG. 5 includes only information on the latitude and longitude, it may further include information on the altitude. The data stored in the parking lot database 208 may further include information provided by the managers of parking lots. Such information may include, for example, the height, width, and length of vehicles that can be parked in each parking lot, limitations as to the vehicle size and engine displacement, RV vehicles, and left-hand vehicles (or right-hand vehicles in right-traffic countries/regions), manager's names, and contact addresses.

The exclusive parking lot data exclusion part 205 (which will also be referred to as the "exclusion part 205" hereinafter) excludes the records of vehicle information in the case where vehicles are parked in exclusive parking lots from the records of vehicle information at times when vehicles are in the parked state. The exclusive parking lot refers to a parking lot in which only one or more specific vehicles are allowed to be parked. Typical exclusive parking lots are home parking lots and leased parking lots. The processing of identifying the records relating to parking in exclusive parking lots will be described later. An exclusive parking lot for a vehicle corresponds to the "specific position relating to the vehicle" according to the present disclosure.

The matching part 206 extracts records of vehicle information of which the parking position coincides with the location of a parking lot stored in the parking lot location database 208 from the records of vehicle information after exclusion done by the exclusion part 205.

In connection with a record of vehicle information of which the parking position coincides with the location of a parking lot stored in the parking lot location database 208, the database registration part 207 adds to the parking lot database 209 data indicating that vehicles of the model specified in the record of vehicle information can be parked in that parking lot. In other words, in cases where the parking position of a vehicle is not at an exclusive parking lot (or a specific position relating to the vehicle) and coincides with the location of a parking lot known in advance, the database registration part 207 adds data indicating that the vehicle of the model specified in the vehicle information can be parked at that parking position (namely, in that parking lot) to the parking lot database 209.

In this embodiment, every time a vehicle is parked, a record including parking lot ID 2091, parking lot name 2092, position information 2093, vehicle model 2094, and date and time of parking 2095 is stored in the parking lot database 209, as shown in FIG. 6A. Thus, the database registration part 207 adds to the database shown in FIG. 6A one record for each vehicle information of which the parking position coincides with the location of a parking lot stored in the parking lot location database 208.

The database shown in FIG. 6A may be summarized for each parking lot to create a parking lot database 209 shown in FIG. 6B. The database shown in FIG. 6B stores parking lot ID 2191, parking lot name 2192, position information 2193, the number of times of parking 2194a of vehicles of model 1, date and time 2194b of the latest parking of a vehicle of model 1, the number of times of parking 2195a of vehicles of model 2, date and time 2195b of the latest parking 2195b of a vehicle of model 2 and so on.

Since the database shown in FIG. 6B can be created from the database shown in FIG. 6A, the database registration part 207 may create the database shown in FIG. 6A first. Alternatively, the database registration part 207 may directly create a database having the same format as that shown in FIG. 6B without using the database shown in FIG. 6A. In that case, each time the database registration part 207 adds a record to the database, the database registration part 207 may increment the number of times of parking of the vehicle model specified in a record of vehicle information by 1 and update the field of "date and time of latest parking" if the date and time of parking in the record of vehicle information is later than the data in that field.

3. Parking Lot Database Creation Process

Next, a process of creating a parking lot database in the server apparatus 2 will be described more specifically with reference to a flow chart in FIG. 7. The process shown in this flow chart is carried out by the CPU 21 of the server apparatus 2 by executing a program loaded from the storage device 23. It is assumed here that reception of vehicle information from vehicles 1 has already been finished, and a sufficient amount of vehicle information is stored in the vehicle information storage part 202.

In step S101, the extraction part 203 consults the vehicle information storage part 202 to extract records of vehicle information at times when vehicles are in the parked state. In this embodiment, records made at times when the accessory power is switched from on to off are extracted as records of vehicle information at times when vehicles are in the parked state. For example, in the case shown in FIG. 3, record R1 indicating that the ACC 1054a is turned off is extracted as a record at a time when the vehicle is in the parked state from among a series of records of vehicle information.

The determination as to the parked state may be made by methods different from the above-described method. For example, it may be determined that a vehicle is in the parked state, when the state of the engine has changed from on to off. Alternatively, if a vehicle has stayed at a certain position longer than a predetermined length of time (e.g. 10 or 30 minutes), it may be determined that the vehicle is in the parked state. Still alternatively, if the parking brake of a vehicle is turned on or the side mirrors are retracted, it may be determined that the vehicle is in the parked state. Still alternatively, if the orientation of a vehicle has changed by a certain angle (e.g. 90 degrees) at the same position or with the engine turned off, it may be determined that the vehicle is in the parked state, because this situation indicates the use of a turntable.

In step S102, the exclusion part 205 excludes data associated with parking in exclusive parking lots from the data extracted in step S101. In this embodiment, in cases where the same vehicle has been parked at the same position at frequencies higher than a predetermined frequency (e.g. twice a week or fifth a month), the exclusive part 205 excludes the records of vehicle information that indicates the parking of that vehicle at that position from the information to be processed. Specifically, in cases where a specific vehicle C1 has been parked at a specific position P1 at a high frequency, all the vehicle information that indicates the parking of that vehicle C1 at that position P1 is excluded from the information to be processed. It is to be understood that vehicle information that indicates parking of the vehicle C1 at a position other than the aforementioned specific position P1 or vehicle information that indicates parking of vehicles other than the vehicle C1 at the aforementioned specific position P1 is not excluded.

In step S103, the matching part 206 extracts records of vehicle information of which the parking position coincides with the location of a parking lot stored in the parking lot location database 208 from the vehicle information after exclusion in step S102.

In step S104, in connection with vehicle information of which the parking position coincides with a parking lot, the database registration part 207 adds to the parking lot database 209 data indicating that vehicles of the model specified in that vehicle information could be parked at the date and time of data acquisition. Specifically, one record of data is added to the database shown in FIG. 6A. In the database, the vehicle model 1052 in the vehicle information is recorded as the vehicle model 2094, and the date and time of data acquisition 1051 is recorded as the date and time of parking 2095.

In this embodiment the database shown in FIG. 6A is the final output. However, a further summarization may be performed to create a database in which the number of times of parking and the date and time of the latest parking are recorded for each parking lot and each vehicle model as shown in FIG. 6B.

4. Advantageous Effects of the Embodiment

According to the first embodiment, it is possible to easily create a parking lot database that enables a judgement to be made as to which model of vehicle (or what size of vehicle) can be parked in each parking lot. Since the parking lot database is created on the basis of vehicle information (probe information) indicating actual parking, a highly accurate parking lot database can be created.

In the first embodiment, a parking lot database is created with vehicle information indicating parking in exclusive parking lots excluded. Therefore, even in cases, for example, where a home parking lot and a general parking lot are located adjacent to each other, it is possible to know correctly the sizes of vehicles that can be parked in that general parking lot. This will be described in the following with reference to FIGS. 8A and 8B.

FIG. 8A shows a case where an exclusive parking lot 81 (personal home parking lot) in which a large size vehicle can be parked and a general parking lot 82 in which a large size vehicle cannot be parked are located adjacent to each other. The exclusive parking lot 81 and the general parking lot 82 shown in FIG. 8 each represent a parking space for one vehicle. Each of the circles and squares in FIG. 8 indicates the position specified in vehicle information associated with parking of vehicles. The letter "L" in the circles and squares represents a large size vehicle, the letter "S" represents a small size vehicle, and the numerals suffixed to the letters "L" and "S" are given to identify different vehicles. Since position information acquired by the GPS apparatus of vehicles contains errors, even in cases where a vehicle L1 is parked in the exclusive parking lot 81, the parking position may be indicated to be in the general parking lot 82 in some cases.

Figure 7:
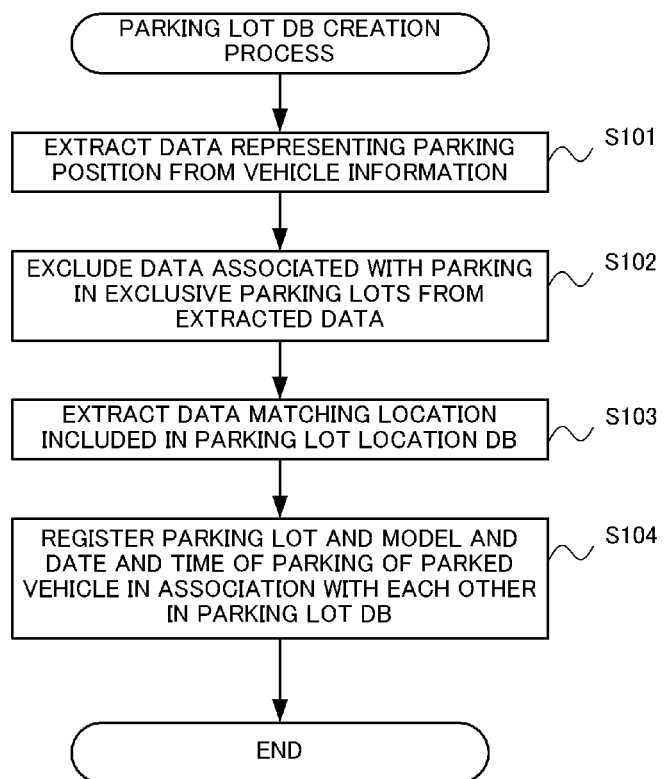
FIG. 7 is a flow chart of a parking lot database creation process.

In the above situation, if a parking lot database is created without exclusion processing by the exclusion part 205 (i.e.

the processing in step S102 in FIG. 7), it is judged that not only small size vehicles S1 to S5 but also the large size vehicle L1 was parked in the general parking lot 82. Then, it is judged that large size vehicles can be parked in the general parking lot 82.

In this embodiment, since the specific large size vehicle L1 has been parked frequently in the exclusive parking lot 81 and the general parking lot 82, vehicle information of this large size vehicle L1 associated with this location is excluded from the information to be processed through the exclusion processing by the exclusion part 205. Consequently, a parking lot database is created for vehicle information of only the small size vehicles S1 to S5 as shown in FIG. 8B. In consequence, it is judged that only small size vehicles have been parked in the general parking lot 82, and the erroneous judgement that large size vehicles can be parked in the general parking lot 82 is prevented from being made.

5. Modification

The above-described embodiment is merely an exemplary mode of the present disclosure, which is not intended to limit the present disclosure by its features. It is to be understood that various modifications can be made to the embodiment within the technical scope of the present disclosure.

5-1. Modification of Vehicle Information

While in the above-described embodiment vehicle information containing vehicle model information is transmitted from vehicles 1 to the server apparatus 2, vehicle model information is not necessarily required to be transmitted. For example, the vehicle model information may be replaced by identification information of the vehicle 1 (vehicle ID) or identification information of the in-vehicle terminal 10 (in-vehicle terminal ID). The server apparatus 2 may use a master database in which the vehicle ID or the in-vehicle terminal ID is stored in association with the model of the vehicle in question to determine the model of the vehicle from the vehicle ID or the in-vehicle terminal ID. The vehicle model information is an example of information representative of the size of a vehicle, and the vehicle model may be replaced by data of the width, length, and height of the vehicle.

5-2. Identification of Exclusive Parking Lot

In the above-described embodiment, vehicle information is analyzed, and a place where a specific vehicle has been parked at a frequency higher than a predetermined frequency is identified as an exclusive parking lot. The method of identifying exclusive parking lots is not limited to this. For example, the server apparatus 2 may use a database in which vehicles and their respective exclusive parking lots (home or leased parking lots) are registered in association in advance to identify exclusive parking lots of vehicles. Moreover, the identification of exclusive parking lots based on vehicle information and identification of exclusive parking lots based on a database may both be employed.

5-3. Analysis of Vehicle Information

In the above-described embodiment, the vehicles 1 transmit all the vehicle information that is acquired periodically to the server apparatus 2, and analysis of the vehicle information (e.g. extraction of parking positions) is carried out in the server apparatus 2. Alternatively, processing on vehicle information may be performed in each vehicle 1, and vehicle information after the processing may be transmitted to the server apparatus 2. Examples of the processing performed in each vehicle 1 include deletion of unnecessary vehicle information and determination of the parked state.

Second Embodiment

In the first embodiment, a parking lot location database in which the locations of general parking lots are stored in advance is used. In the second embodiment, a parking lot location database is created on the basis of vehicle information (probe information), and a parking lot database is created using the parking lot location database thus created.

The configuration of the system according to the second embodiment is basically the same as that according to the first embodiment, but the configuration of the server apparatus 2 (which constitutes a parking lot database creation apparatus) is different from that according to the first embodiment. In the following, what is different from the first embodiment will be mainly described.

Figure 9:
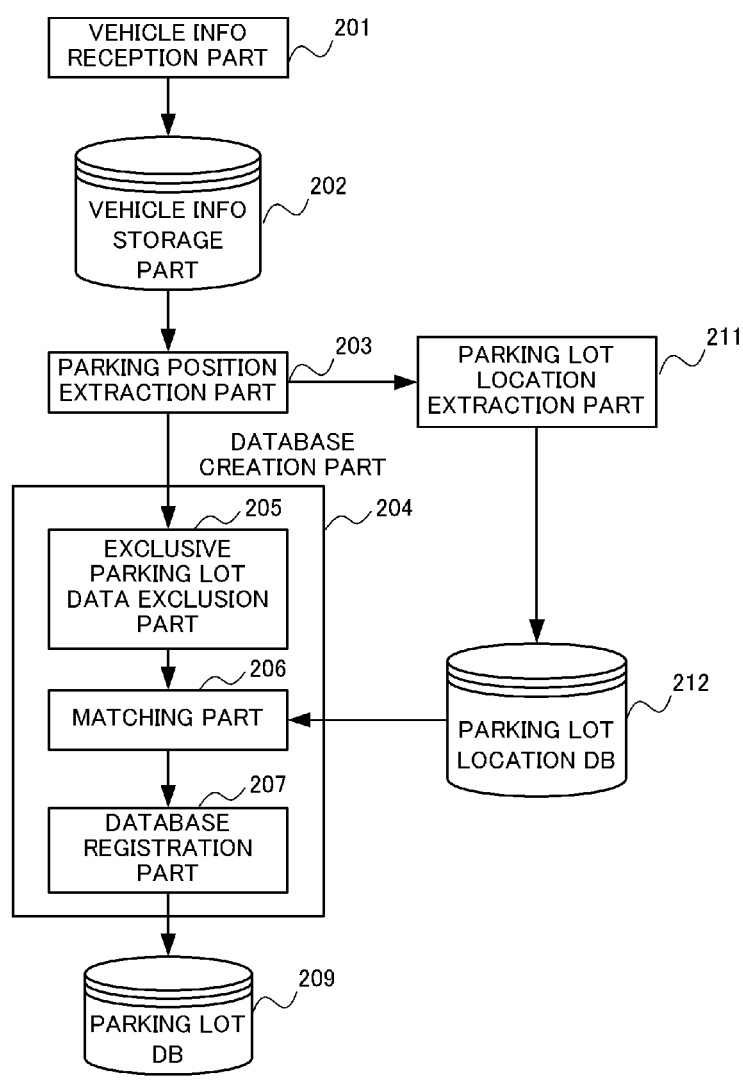
FIG. 9 is a diagram showing the functional configuration of a server apparatus according to a second embodiment.

In the server apparatus 2, the CPU 21 executes a program to implement the functions shown in FIG. 9. Specifically, the server apparatus 2 has a parking lot location extraction part 211 in addition to the functions that the server apparatus 2 according to the first embodiment has.

The parking lot location extraction part 211 judges whether or not parking positions extracted by the extraction part 203 are in areas in which parking is allowed by laws and regulations (or whether or not the parking positions are in no-parking area). The parking lot location extraction part 211 may use a database in which areas in which parking is allowed are defined in advance to judge whether or not parking positions extracted by the extraction part 203 are in areas in which parking is allowed. Alternatively, the parking lot location extraction part 211 may judge whether or not a parking position extracted by the extraction part 203 infringes no-parking conditions every time the parking position is extracted. According to Japanese laws and regulations, for example, no parking areas include areas within 5 meters from the edges of intersections, areas within 5 meters from pedestrian crossings, areas within 10 meters from railroad crossings, areas in tunnels, railroads, and railroad crossings, and areas on hilltops etc. The parking lot location extraction part 211 does not regard positions in such areas as parking lots, even if they are extracted by the extraction part 203. The parking lot position extraction part 211 may regard parking positions at which only specific vehicles are parked as exclusive parking lots.

The parking lot extraction part 211 may be configured not to regard such positions as parking lots at which the frequency of parking in the past is lower than a predetermined frequency. The parking lot extraction part 211 may be configured not to regard such positions as parking lots at which the number of vehicles parked in the past is lower than a predetermined number.

The parking lot location extraction part 211 creates a parking lot location database 212 on the basis of positions extracted as parking lots. FIG. 10 is a table showing the content of the parking lot database 212 thus created. As shown in FIG. 10, data in the parking lot location database 212 includes parking lot ID 2121, flag 2122 indicating whether each parking lot is an exclusive parking lot or not, flag 2122 indicating whether each parking lot is in a no parking area or not, and location information 2124.

The processing other than described above is basically the same as that in the first embodiment. However, in this embodiment, since a parking lot database 209 is created from the above-described parking lot database 212 shown in FIG. 10, the parking lot database 209 includes flag 2096 indicating whether each parking lot is an exclusive parking lot or not and flag 2097 indicating whether each parking lot is in a no parking area or not, as shown in FIG. 11.

As above, according to the second embodiment, a parking lot location database is created automatically from vehicle information to eliminate the need for manual creation of a parking lot location database. Moreover, it is possible to know the locations of parking lots on the basis of up-to-date information.

Third Embodiment

Figure 12:
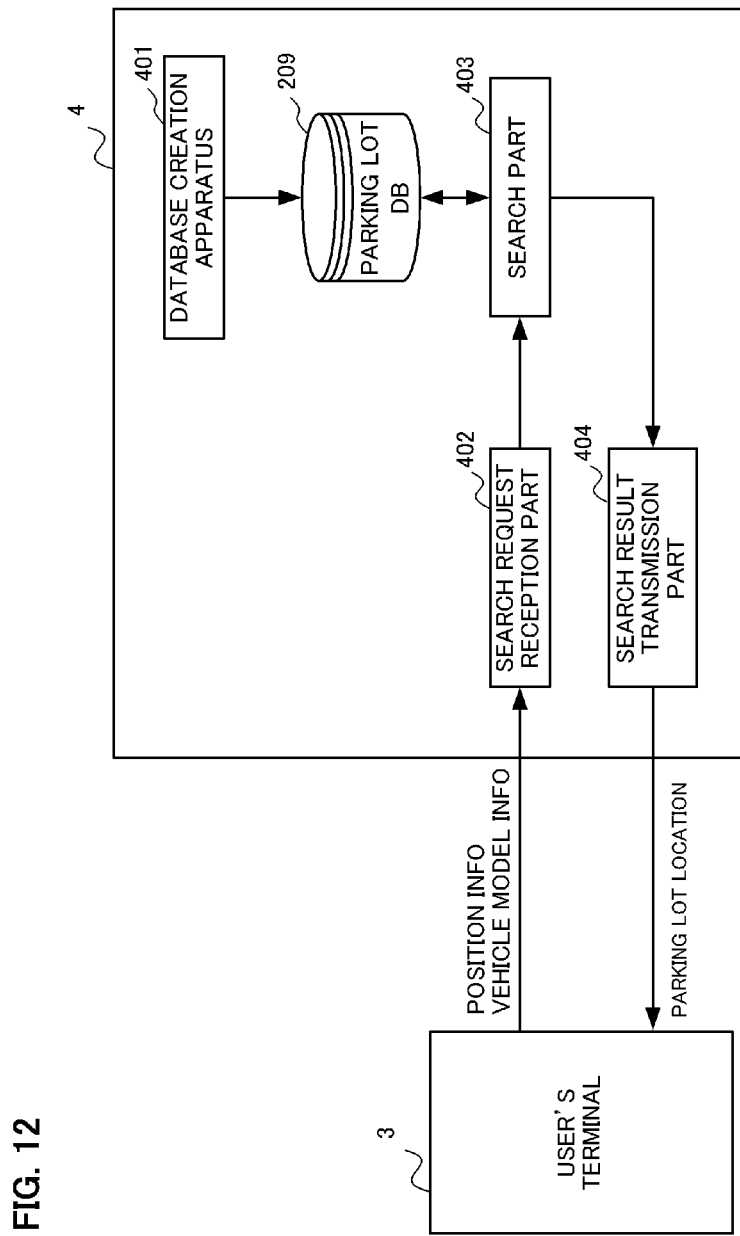
FIG. 12 is a diagram showing the configuration of a parking lot search system according to a third embodiment.

The third embodiment relates to a parking lot search system utilizing a parking lot database created according to the first or second embodiment. FIG. 12 is a diagram showing the configuration of a parking lot search system according to the third embodiment. As shown in FIG. 12, the parking lot search system includes a user's terminal 3 and a parking lot search apparatus 4.

The user's terminal 3 may be an in-vehicle terminal or an information processing device such as a smartphone or portable information terminal. The user's terminal 3 is a computer having a GPS function. The user's terminal 3 sends to the parking lot search apparatus 4 a search request including position information and vehicle model information to request search for parking lots near the position specified by the position information in which a vehicle of the model specified by the vehicle model information can be parked.

The parking lot search apparatus 4 is an information processing apparatus having a CPU, a RAM, a ROM, and a communication I/F. The parking lot search system 4 includes a database creation apparatus 401, a parking lot database 209, a search request reception part 402, a search part 403, and a search result transmission part 404.

Since the database creation apparatus 401 is the same as that described in the description of the first embodiment (shown in FIG. 4) or the second embodiment (shown in FIG. 9), it will not be described specifically. The database creation apparatus 401 creates the parking lot database 209.

The search request reception part 402 receives the search request including position information and vehicle model information from the user's terminal 3. Upon receiving the search request, the search request reception part 402 transfers the search request to the search part 403.

The search part 403 searches the parking lot database 209 for parking lots in the area near the position specified in the search request (or target position) in which a vehicle of the model specified in the search request (or target vehicle model) can be parked. Specifically, the search part 403 seeks parking lots located within a predetermined distance from the target position for which a record of parking of a vehicle of the target model is present. In connection with this search, the condition about the presence of record of parking may be the presence of not only one record of parking but more than a predetermined number of records of parking (in other words, more than a plurality of times of parking in the past).

In cases where there are plurality of parking lots that satisfy the above condition, the search part 403 may set an order of priority. Specifically, the larger the number of times of parking of vehicles of the target model in a parking lot is, the higher the priority assigned to that parking lot may be made. Furthermore, the later the date and time of the latest parking of a vehicle of the target model in a parking lot is, the higher the priority assigned to that parking lot may be made. Still further, the smaller the distance from the target position to a parking lot is, the higher the priority assigned to that parking lot may be made. Alternatively, priorities may be assigned taking account of the above-described factors in combination.

The search result transmission part 404 sends the result of search by the search part 403 to the user's terminal 3. The search result transmission part 404 may send to the user' terminal 3 only the search result having the highest priority. Alternatively, the search result transmission part 404 may send to the user's terminal 3 all or a few higher priority search results with the order of priority.

According to the third embodiment, parking lots in which a vehicle of the target model can be parked can easily be searched for through the user's terminal 3.

It is preferred that the parking lot search apparatus 4 according to this embodiment include a vacancy information acquisition part that acquires vacancy information indicating whether or not parking lots actually have a vacant space(s). In the case where such vacancy information is available, the search part 403 may search for parking lots that meet the search condition and have a vacant space(s).

It is preferred that search be conducted using inclusion relation in the possibility of parking among different models. An example of such inclusion relation is that if a vehicle of model A can be parked, then a vehicle of model B can also be parked. In cases where such inclusion relationship is available, it is possible to judge that vehicles of model B can be parked in a parking lot, if a record(s) of parking of a vehicle(s) of model A in that parking lot is present, even if a record(s) of parking of a vehicle(s) of model B in that parking lot is absent. This can increase the number of parking lots found by search. Such inclusion relationship in the possibility of parking may be created manually by an administrator. Alternatively, such inclusion relationship in the possibility of parking may be created by analyzing vehicle information sent from vehicles 1. The search based on inclusion relationship in the possibility of parking is not necessarily correct. Therefore, it is preferred that the search based on inclusion relationship be conducted in cases where parking lots that meet the search condition are not found or that parking lots found by the search based on inclusion relationship be given lower priorities.

In this embodiment, the search request is configured to include vehicle model information, which is an example of information indicating the size of the vehicle. Therefore, the vehicle model information may be replaced by information about the width, length, and height of the vehicle.

In the above description of this embodiment, there has been described a case where a search request is entered to the parking lot search apparatus 4 from the user's terminal 3 through wireless communication. Alternatively, an operator may enter the search condition by directly operating the parking lot search apparatus 4 to search for parking lots. In that case, the result of search is displayed on a screen. This mode can be employed in cases where the search for parking lots are conducted by the operator on the basis of voice communication with a driver of a vehicle.

Modification

The features of the above-described embodiments can be modified as appropriate or employed in different combinations without departing from the technical scope of the present disclosure. For example, the parking lot database creation apparatus or the parking lot search apparatus is not necessarily implemented by a single server apparatus (or computer). They may be implemented by a plurality of computers that execute functions distributed thereto.

Embodiment(s) of the present disclosure can also be implemented by a computer of a system or apparatus that reads out and executes a computer program recorded on a non-transitory computer-readable storage medium to perform the functions of one or more of the above-described embodiment(s) and/or that includes one or more circuits (e.g., application specific integrated circuit (ASIC)) for performing the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instruction may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

What is claimed is:

1. A database creation apparatus comprising:
    a controller comprising at least one processor configured to:
    (1) acquire vehicle information including position information and status information of a vehicle and information relating to vehicle size of said vehicle associated with each other;
    (2) extract a position of said vehicle in a parked state on the basis of said vehicle information; and
    (3) add data indicating that general vehicles of the same vehicle size as said vehicle can be parked at said position to a parking lot database when the position of said vehicle in the parked state is not an exclusive parking lot for said vehicle, and do not add the data when the position of said vehicle in the parked state is said exclusive parking lot,
    wherein said exclusive parking lot is a parking lot at which only said vehicle or only specific vehicles including said vehicle are allowed be parked and general vehicles are not allowed be parked.

2. The database creation apparatus according to claim 1, wherein said position is a position at which said vehicle is parked at a frequency higher than a predetermined frequency.

3. The database creation apparatus according to claim 1, wherein said position is a position registered in advance in association with said vehicle.

4. The database creation apparatus according to claim 1, wherein said information relating to vehicle size is the model of said vehicle.

5. The database creation apparatus according to claim 1, further comprising a parking lot location database in which the locations of parking lots are stored in advance, wherein said processor is further configured to add data indicating that general vehicles of the same vehicle size as said vehicle can be parked at said position to said parking lot database, if the position of said vehicle in the parked state coincides with the location of a parking lot stored in said parking lot location database.

6. The database creation apparatus according to claim 1, wherein said processor is further configured to (1) extract, on the basis of said vehicle information, the position of said vehicle in the parked state at which parking is allowed by laws and regulations as the location of a parking lot and (2) store it in a parking lot location database, and
    wherein said processor is further configured to add data indicating that general vehicles of the same vehicle size as said vehicle can be parked at said position to said parking lot database, if the position of said vehicle in the parked state coincides with the location of a parking lot stored in said parking lot location database.

7. The database creation apparatus according to a claim 1, wherein said processor is further configured to extract the position specified by the positional information in said vehicle information at the time (1) when the accessory power is turned off, the ignition switch is turned off, or the parking brake is turned on in said vehicle, (2) when said vehicle has been parked longer than a predetermined length of time, or (3) when said vehicle turns at a position, as the position of said vehicle in the parked state.

8. A parking lot search apparatus comprising:
    a database creation apparatus for creating a parking lot database by using the database creation apparatus according to claim 1; and database creation apparatus
    a controller comprising at least one processor configured to:
    (1) receive from a user's terminal a search request including position information and information relating to vehicle size that requests search for parking lots in which a vehicle of said vehicle size can be parked in an area within a predetermined distance from the position specified by said position information;
    (2) search said parking lot database for parking lots in which a vehicle of said vehicle size can be parked in an area within said predetermined distance from the position specified by said position information included in said search request; and
    (3) send information about parking lots found by search to said user's terminal.

9. The parking lot search apparatus according to claim 8, wherein said processor is further configured to, in cases where there are a plurality of parking lots that meet the search request, assign higher priorities to parking lots in which the number of times of parking of vehicles of said vehicle size specified in said search request in the past is larger.

10. The parking lot search apparatus according to claim 8, wherein said processor is further configured to, in cases where there are a plurality of parking lots that meet the search request, assign higher priorities to parking lots of which the time of latest parking of a vehicle of said vehicle size specified in said search request is later.

11. The parking lot search apparatus according to claim 8, wherein said information relating to vehicle size is information about vehicle model, and wherein said processor is further configured to search said parking lot database for parking lots that meet said search request taking into consideration inclusion relation in the possibility of parking among vehicle models.

12. The parking lot search apparatus according to a claim 8, wherein said processor is further configured to acquire information about the vacancy of parking lots, and wherein said processor is further configured to search for parking lots that meet said search request and have a vacant space.

13. A database creation method performed by a computer, comprising:
- acquiring vehicle information including position information and status information of a vehicle and information relating to vehicle size of said vehicle associated with each other;
- extracting a position of said vehicle in a parked state on the basis of said vehicle information; and
- adding data indicating that general vehicles of the same vehicle size as said vehicle can be parked at said position to a parking lot database when the position of said vehicle in the parked state is not an exclusive parking lot for said vehicle, and do not add the data when the position of said vehicle in the parked state is said exclusive parking lot,
- wherein said exclusive parking lot is a parking lot at which only said vehicle or only specific vehicles including said vehicle are allowed be parked and general vehicles are not allowed be parked.

14. A non-transitory computer-readable medium storing a program which, when run by a computer, causes the computer to execute the steps in a method according to claim 13.

* * * * *